Patented Sept. 24, 1940

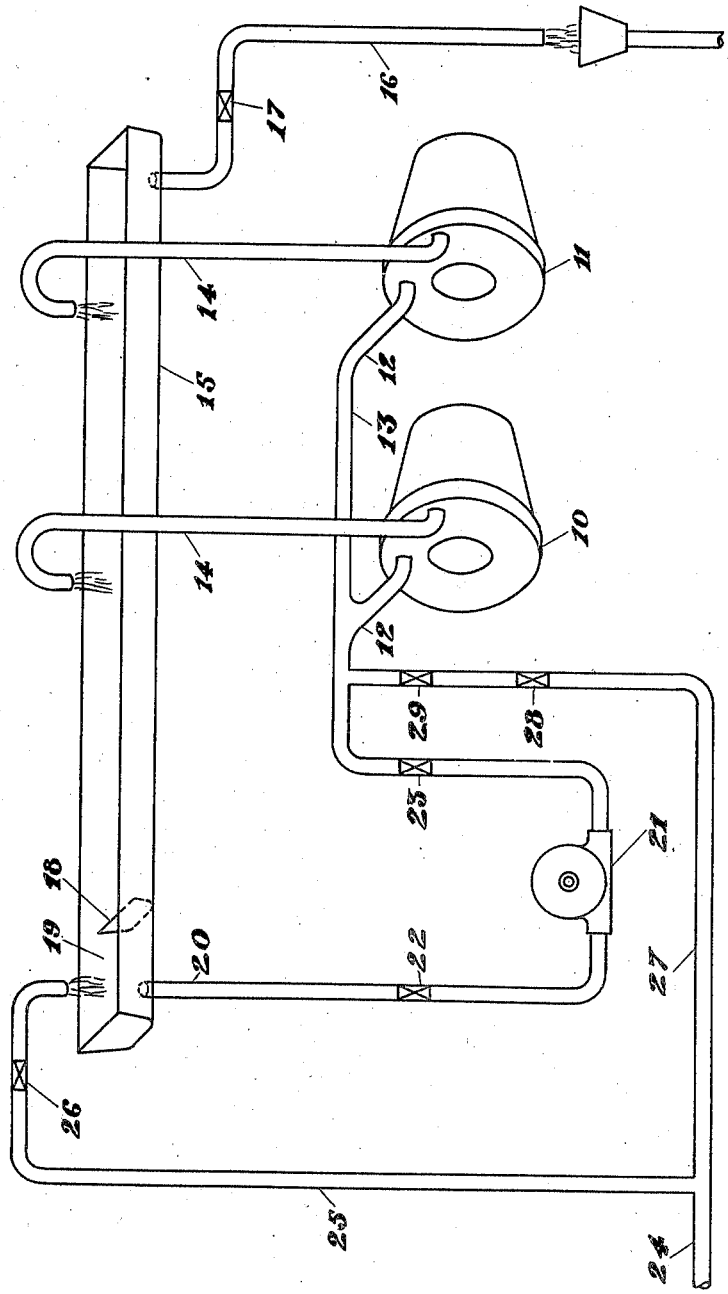

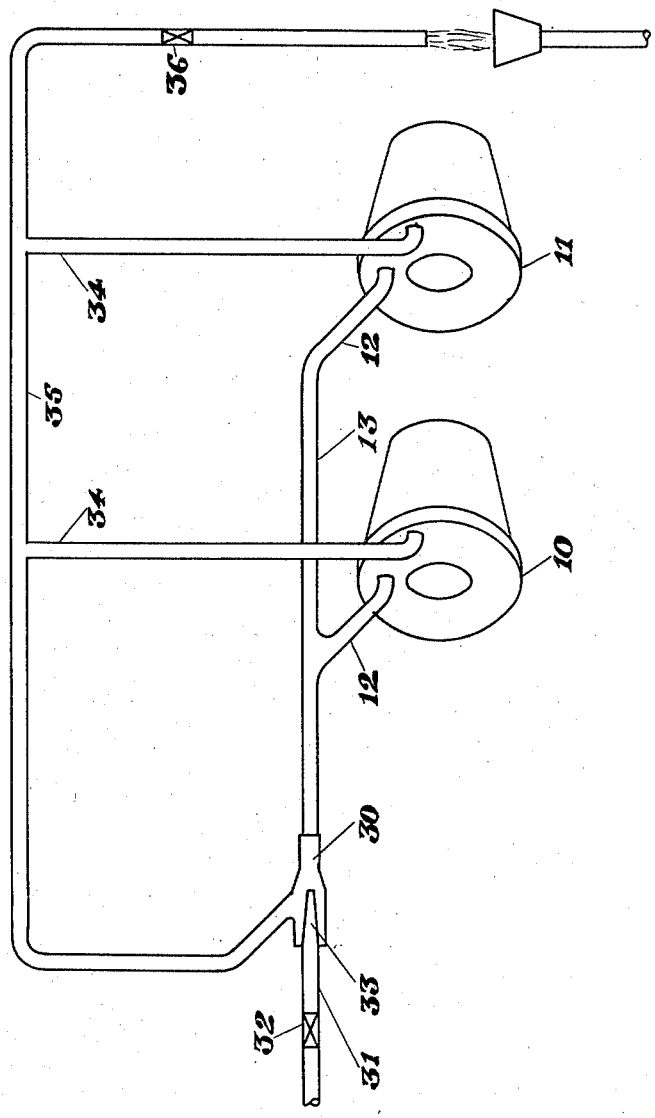

2,215,871

UNITED STATES PATENT OFFICE 2,215,871

MEANS FOR COOLING TUYÈRES OR THE LIKE

Gordon Fox, Chicago, Ill., assignor to Freyn Engineering Company, Chicago, Ill., a corporation of Maine Application October 30, 1936, Serial No. 108,348

8 Claims. (Cl. 62—1)

The present invention relates to means for cooling tuyères or the like.

The present invention will be described in connection with tuyères such as are used in blast furnaces. In such tuyères a problem which has confronted operatives is that, due to the high temperatures of the blast and to the high temperatures within the furnace, the tuyères have had a tendency to burn out. It is common practice to cool such tuyères with flowing water.

Tuyères in a blast furnace are sometimes subjected to emergency conditions, as for example when a splash of the molten metal strikes a tuyère. In ordinary operating practice the amount of water which is passed through a tuyère is much greater than necessary to conduct away the heat radiated thereto by the furnace under normal operating conditions. The rise in temperature of the cooling water under usual operating conditions between the inlet and outlet thereof is but a few degrees Fahrenheit. The liberal flow of cooling water is presumed to afford a factor of safety which is supposed to be helpful at times when hot metal splashes upon the tuyère. At such times the heat absorption of the tuyère is increased, but even under these conditions the rise in temperature of the water passing through the tuyère is not substantially increased. In short, the amount of water which flows through the tuyère cooling system and thence to the sewer is vastly greater than necessary as a means to absorb and dispose of the heat which is absorbed by the tuyères either during normal conditions or during conditions of hot metal contact.

It has been established that the transfer of heat between a medium of low heat conductivity flowing in a passage and the walls of said passage does not increase rapidly with velocity of flow until a velocity is attained at which turbulence takes place. Up to this point there is a stratification of the flowing medium which prevents effective transfer of heat from the passage walls to the core of the flowing medium. Only the peripheral portions of the flowing medium which contact the passage walls are really effective as a cooling medium. When turbulence occurs, however, the stratification is broken up and substantially the entire quantity of fluid passing through the passage is brought into effective contact with the passage walls and the rate of heat transfer is greatly increased.

When hot metal splashes against the exterior of the nose region of the tuyère, a race takes place between the heat input from this hot metal and the cooling effect of the water passing through the interior of the tuyère. The hot metal has a substantial advantage because of the fact that it has relatively high heat conductivity, so that there is a rapid heat transfer through the molten metal to the exterior surface of the tuyère. The water passing through the interior of the tuyère is a medium of extremely low conductivity. As a result, only the peripheral portions of the water in contact with the walls of the passage are really effective. Furthermore, the molten metal causes the copper in the nose region of the tuyère (at least locally) to attain temperatures in excess of the boiling point of the cooling water. As a result, there is a tendency for a film of steam to form at the juncture of the cooling water and the interior surface of the tuyère. This serves as an insulator which interferes with effective cooling by the water.

An object of the present invention is to provide means for increasing the effectiveness of the cooling water in water-cooled tuyères.

A further object is to provide means for cooling tuyères which, without waste of water, will provide a velocity of flow through the cooling channels of the tuyère sufficient to cause turbulence and also to carry off any steam bubbles which may tend to form.

A further object of the invention is to provide a system of recirculation for the cooling water of a tuyère which will permit large quantities of water to be passed through the tuyère and at the same time restrict the amount of water passing to the sewer.

A further object is to provide a system for cooling tuyères or the like which provides for the recirculation of cooling water and which allows only sufficient water to pass to the sewer to actually conduct away the heat absorbed by the tuyères.

A further object is to provide an improved method of operating the cooling medium applied to tuyères or the like whereby said cooling medium may be conserved and at the same time said cooling medium will perform its functions with improved efficiency.

Further objects will appear as the description proceeds.

Though the invention will be described in connection with tuyères, it will be understood as the description proceeds that the invention has a broader application.

Referring to the drawings—

Figure 1 is a diagrammatic view illustrating one embodiment of the present invention; and Figure 2 illustrates a modification.

Referring first to Figure 1, the numerals 10 and 11 indicate tuyères which may be representative of those spaced circumferentially around a blast furnace. Each of said tuyères has an inlet pipe 12 connected thereto, which inlet pipes are connected to a circle pipe 13 adapted to supply cooling medium to said tuyères. Discharge pipes 14—14 are connected to said tuyères, which outlet pipes 14—14 are adapted to discharge into the overflow trough 15. Said overflow trough 15 at one of its ends is provided with the discharge pipe 16 controlled by the control valve 17. Said discharge pipe 16 may discharge through a visible overflow to the sewer.

Disposed adjacent to the other end of the overflow trough 15 is the weir plate 18 providing the pocket 19. Communicating with the pocket 19 at the bottom thereof is the recirculation line 20 connected to the circle pipe 13. A flowing pool of water is formed within the trough 15. Disposed in the recirculation line 20 is the pump 21. Between the pocket 19 of the overflow trough 15 and said pump 21 is the check valve 22, which prevents the flow of water backward through the pump 21 toward the overflow trough 15. Disposed between the pump 21 and the circle pipe 13 is the control valve 23.

The numeral 24 indicates a pipe line connecting with a source of fresh water. Said pipe line 24 has a branch, indicated by the numeral 25, adapted to discharge into the pocket 19 of the trough 15. Disposed in said branch 25 is the control valve 26. Said pipe line 24 is also provided with a branch 27 connected to the circle pipe 13. Disposed within said branch 27 is the control valve 28 and the check valve 29.

The mode of operation of the system disclosed in Figure 1 is substantially as follows:

When it is desired to circulate cooling water through the tuyères 10 and 11, the pump 21 will be set in operation and will deliver water from the pocket 19 of the trough 15 at high velocity to the circle pipe 13. Water from said circle pipe 13 will be delivered to the tuyères at sufficiently high velocity to set up the turbulence above referred to, whereby stratification in the flow of water to the tuyères will be broken up.

As noted above, the rise in temperature of the cooling water in its passage through a tuyère even under adverse conditions is relatively small. The present invention, therefore, contemplates the recirculation of a considerable part of the water flowing through the tuyères. This recirculation will be through the discharge pipes 14, trough 15 over the weir plate 18 to the pocket 19, through the recirculation line 20, to pump 21 and back to the tuyères. Make-up water will be admitted from the pipe line 24. Under normal conditions the control valve 28 will be closed and the make-up water will pass through the branch 25 to the pocket 19. Water will be drawn off through the discharge pipe 16 and delivered to the sewer. In the event of failure of the pump 21 the control valve 28 will be opened and makeup water will be delivered directly from the pipe line 24 to the circle pipe 13. Under these conditions the check valve 22 will prevent back-flow of water from the branch 27 through the recirculation line 20. Under normal conditions, however, the pressure developed within the circle pipe 13 by the pump 21 will be higher than that available from the pipe line 24. Passage back through the branch 27 will be prevented by the check valve 29.

The system disclosed in Figure 1 will permit a high velocity of flow through the tuyères while requiring only a minimum use of make-up water. Circulation is permitted even though the make-up source should be temporarily interrupted. The power requirement for circulating the water may be chosen to suit conditions, thereby eliminating the necessity for throttling. Inasmuch as the flow of water through the tuyères is great compared to the inflow of water through the pipe 25, the direction of flow of water in the reservoir 15 will be from right to left as the parts are viewed in Figure 1 over the weir plate 18. In view of this inevitable direction of flow in the reservoir 15, the result is assured that none of the relatively cool water admitted through the pipe 25 will be discharged directly from the reservoir 15 through the pipe 16. In other words, the discharge pipe 16 carries off only water which has been passed through the tuyères.

Figure 2 discloses a modification of the structure shown in Figure 1. According to Figure 2, the relatively high pressure of the water supply is utilized in recirculating the water through the tuyères. According to the disclosure in Figure 2, tuyères 10 and 11 have connected thereto the inlet pipes 12—12 which receive their supply of cooling water from the circle pipe 13. Said circle pipe 13 is connected to the aspirator pump or injector pump 30. Also connected to said aspirator pump 30 is the pipe line 31 having therein the control valve 32. Said pipe line 31 connects with the nozzle 33 forming part of the injector 30.

The discharge outlets of the tuyères 10 and 11 are connected to the discharge pipes 34—34 connecting with the discharge main 35. Said discharge main 35 at one extremity may discharge to the sewer, the discharge being controlled by the control valve 36. The other extremity of the discharge main 35 is connected to the suction side of the aspirator pump 30.

The mode of operation of the system disclosed in Figure 2 will be obvious without detailed explanation. The make-up water will be supplied by the pipe line 31, which make-up water will pass by way of the circle pipe 13 to the various tuyères. By reason of the aspirating action of the aspirator pump 30, the discharge water (which as noted above will be only a slightly higher temperature than the water admitted to the tuyères) will be recirculated to the circle pipe 13 and thence to the tuyères. The overflow will pass the control valve 36 to the sewer.

Although certain preferred embodiments of the invention have been described in detail, many modifications will occur to those skilled in the art. It is intended to cover all such modifications that fall within the scope of the appended claims.

What is claimed is—

1. In a cooling system, in combination, a device to be cooled, means for recirculating cooling medium through said device, said recirculating means including a pump and reservoir means, said reservoir means having a discharge outlet, and means for admitting fresh cooling medium through said reservoir means to make up for that discharged from said reservoir means, said reservoir means being provided with weir means dividing it into two compartments, one for receiving cooling medium from said device and the other for receiving said fresh cooling medium and for delivering cooling medium to said pump.

2. In a cooling system, in combination, a device to be cooled, a reservoir, means including a pump for delivering cooling medium from said reservoir to said device, means for discharging said cooling medium from said device to said reservoir, means for discharging cooling medium from said reservoir, and means for delivering fresh cooling medium to said reservoir, said discharge outlet being located in position to discharge cooling medium only after it has passed through said device.

3. In a cooling system, in combination, a device to be cooled, a reservoir, means including a pump for delivering cooling medium from said reservoir to said device, means for discharging said cooling medium from said device to said reservoir, means for discharging cooling medium from said reservoir, means for delivering fresh cooling medium to said reservoir, and separate supply means arranged in parallel relationship with said pump and said reservoir for delivering fresh cooling medium to said device.

4. In a cooling system, in combination, a device to be cooled, a reservoir, means including a pump for delivering cooling medium from said reservoir to said device, means for discharging said cooling medium from said device to said reservoir, means for discharging cooling medium from said reservoir, means for delivering fresh cooling medium to said reservoir, separate supply means arranged in parallel relationship with said pump and said reservoir for delivering fresh cooling medium to said device, and check valves for preventing discharge through said last named means from said pump when said pump is operative and for preventing back discharge through said pump when said pump is inoperative.

5. In a cooling system, in combination, a device to be cooled, means for admitting cooling medium to said device, means for receiving medium discharged from said device, a pump for recirculating cooling medium from said receiving means back to said device, means for delivering to waste a portion of said cooling medium from said receiving means, and means for adding fresh cooling medium to said system to replace that discharged to waste, said last mentioned means being connected to deliver cooling medium to said receiving means, said delivering means being located in position to carry off only cooling medium which has passed directly from said device.

6. In a cooling system, in combination, a device to be cooled, means for admitting cooling medium to said device, means for receiving medium discharged from said device, a pump for recirculating cooling medium from said receiving means back to said device, means for delivering to waste a portion of said cooling medium from said receiving means, means for adding fresh cooling medium to said system to replace that discharged to waste, said last mentioned means being connected to deliver cooling medium to said receiving means, and an auxiliary line disposed in parallel relationship with said receiving means and said pump for delivering cooling medium to said device.

7. In a cooling system, in combination, a device to be cooled, means for admitting cooling medium to said device, means for receiving medium discharged from said device, a pump for recirculating cooling medium from said receiving means back to said device, means for delivering to waste a portion of said cooling medium from said receiving means, means for adding fresh cooling medium to said system to replace that discharged to waste, said last mentioned means being connected to deliver cooling medium to said receiving means, an auxiliary line disposed in parallel relationship with said receiving means and said pump for delivering cooling medium to said device, and check valves for stopping reverse flow of cooling medium through said pump and through said auxiliary line.

8. The method of cooling which includes the recirculation of cooling medium through a device to be cooled with the provision of a flowing pool of said cooling medium in the circulatory cycle, said pool being fed by discharge from said device, adding make-up cooling medium to the exit end of said flowing pool in advance of said device and discharging heated cooling medium which has passed through said device, said addition and said discharge being at substantially the same rate, the recirculation of cooling medium through said device being at a rate of flow greater than that corresponding to the flow of make-up and discharge, said cooling medium being liquid throughout the cycle.

GORDON FOX.